US012705654B2

(12) United States Patent
Cárdenes Cabré et al.

(10) Patent No.: US 12,705,654 B2
(45) Date of Patent: Aug. 11, 2026

(54) DELEGATED ACCESS USING VERIFIABLE CREDENTIALS

(71) Applicant: Via Science, Inc., Somerville, MA (US)

(72) Inventors: Jesús Alejandro Cárdenes Cabré, Montreal (CA); Madjid Aoudia, Rennes (FR); Jeremy Taylor, Montreal (CA)

(73) Assignee: Via Science, Inc., Sommerville, MA (US)

( * ) Notice: Subject to any disclaimer, the term of this patent is extended or adjusted under 35 U.S.C. 154(b) by 0 days.

(21) Appl. No.: 19/407,896

(22) Filed: Dec. 3, 2025

(65) Prior Publication Data

US 2026/0162161 A1 Jun. 11, 2026

Related U.S. Application Data

(60) Provisional application No. 63/730,031, filed on Dec. 10, 2024.

(51) Int. Cl.
*G06Q 30/0601* (2023.01)
*G06Q 20/38* (2012.01)

(52) U.S. Cl.
CPC ..... *G06Q 30/0613* (2013.01); *G06Q 20/3827* (2013.01); *G06Q 20/3829* (2013.01); *G06Q 30/0617* (2013.01)

(58) Field of Classification Search
CPC ........... G06Q 20/3829; G06Q 20/3827; G06Q 30/0613; G06Q 30/0617

(Continued)

(56) References Cited

U.S. PATENT DOCUMENTS 6,091,835 A * 7/2000 Smithies ................ G06V 10/94 340/5.86
7,478,239 B1 * 1/2009 Rosen ................ G06Q 20/3829 713/172

(Continued)

OTHER PUBLICATIONS

Notification of Transmittal of the International Search Report and the Written Opinion of the International Searching Authority, for International Patent Application No. PCT/US2025/057935, mailed on Feb. 23, 2026, 16 pages.

(Continued)

*Primary Examiner* — Wodajo Getachew
(74) *Attorney, Agent, or Firm* — Pierce Atwood LLP

(57) ABSTRACT

A system may be configured to allow agents to execute transactions, subject to prior agreement between principals, when operating in denied, degraded, intermittent, and limited (DDIL) environments. In a DDIL environment, the agents may lack reliable network connectivity with their respective principals or other central authority for obtaining authorization for transactions. A service provider and a service consumer may agree to delegate advance authorization to a service provider agent and a service consumer agent to execute certain transactions on behalf of the service provider and service consumer. The agents may maintain audit logs of transactions that may be uploaded to the central authority when network connectivity is available, allowing the service consumer and service provider to settle accounts. If transactions occur before a rule change has been propagated to the agents, the system may include a mechanism for rolling back a transaction that is invalid under the new rule.

12 Claims, 7 Drawing Sheets

(58) Field of Classification Search
USPC ........................................................... 705/75
See application file for complete search history.

(56) References Cited

U.S. PATENT DOCUMENTS

| | | | | |
|---|---|---|---|---|
| 8,140,617 | B1 * | 3/2012 | Ewe | H04L 67/59<br>709/219 |
| 2006/0004675 | A1 * | 1/2006 | Bennett | G06Q 10/08345<br>705/402 |
| 2021/0266171 | A1 * | 8/2021 | Huang | H04L 9/0897 |
| 2021/0334802 | A1 * | 10/2021 | Zhang | G06F 21/64 |
| 2021/0399903 | A1 * | 12/2021 | Brossard | H04L 9/3247 |
| 2024/0020696 | A1 * | 1/2024 | Hoshizuki | H04L 9/3247 |
| 2024/0248969 | A1 | 7/2024 | Park | |
| 2024/0314131 | A1 * | 9/2024 | Cárdenes Cabré | H04L 9/50 |

OTHER PUBLICATIONS

Belchior, R., et al. “SSIBAC: Self-Sovereign Identity Based Access Control.” 2020 IEEE 19th International Conference on Trust, Security and Privacy in Computing and Communications (TrustCom) XP033900847 (2020), 9 pages.

* cited by examiner

Program 155
Blockchain 150
Central Authority 160
Transaction 165
SC-Pub_K 112
SC-Priv_K 114
Service Consumer (SC) 110
Network(s) 199a
Service Provider (SP) 130
SP-Pub_K 132
SP-Priv_K 134
Network(s) (DDIL) 199b
Digital Wallet 126
SC-A-Pub_K 122
VC(s) 115
SC-A-Priv_K 124
Audit Log 128
SC Agent (SC-A) 120
VP 125
SP Agent (SP-A) 140
Audit Log 148
Program 155

SC 110
SC-A 120
SP-A 140
SP 130
Central Authority 160
Blockchain 150
Register 202
SC-Pub_K 204
Generate SC-A-Priv_K / SC-A-Pub_K pair 206
SC-A-Pub_K 208
Request VC 210
Generate Verified Credential (VC) with SC-Pub_K and SC-A-Pub_K 212
VC signed with SP-Priv_K 214
VC signed with SC-Priv_K 216
Generate Program for Verifying transaction requests 218
Program or hash 220
Program 222
Retrieve/verify program 224
Program 226

SC 110
SC-A 120
SP-A 140
SP 130
Central Authority 160
Generate verifiable presentation (VP) by signing VC SC-A-Priv_K 232
Request (with VP) 234
Identify Action 236
Use Action to Identify Program 238
Use Program to Verify Request and VP 240
Allow? 242
Yes
No
Deny Transaction 244
Execute Transaction 246
Record Transaction 248
Record Transaction 250
Upload audit log 252
Upload audit log 254

FIG. 5

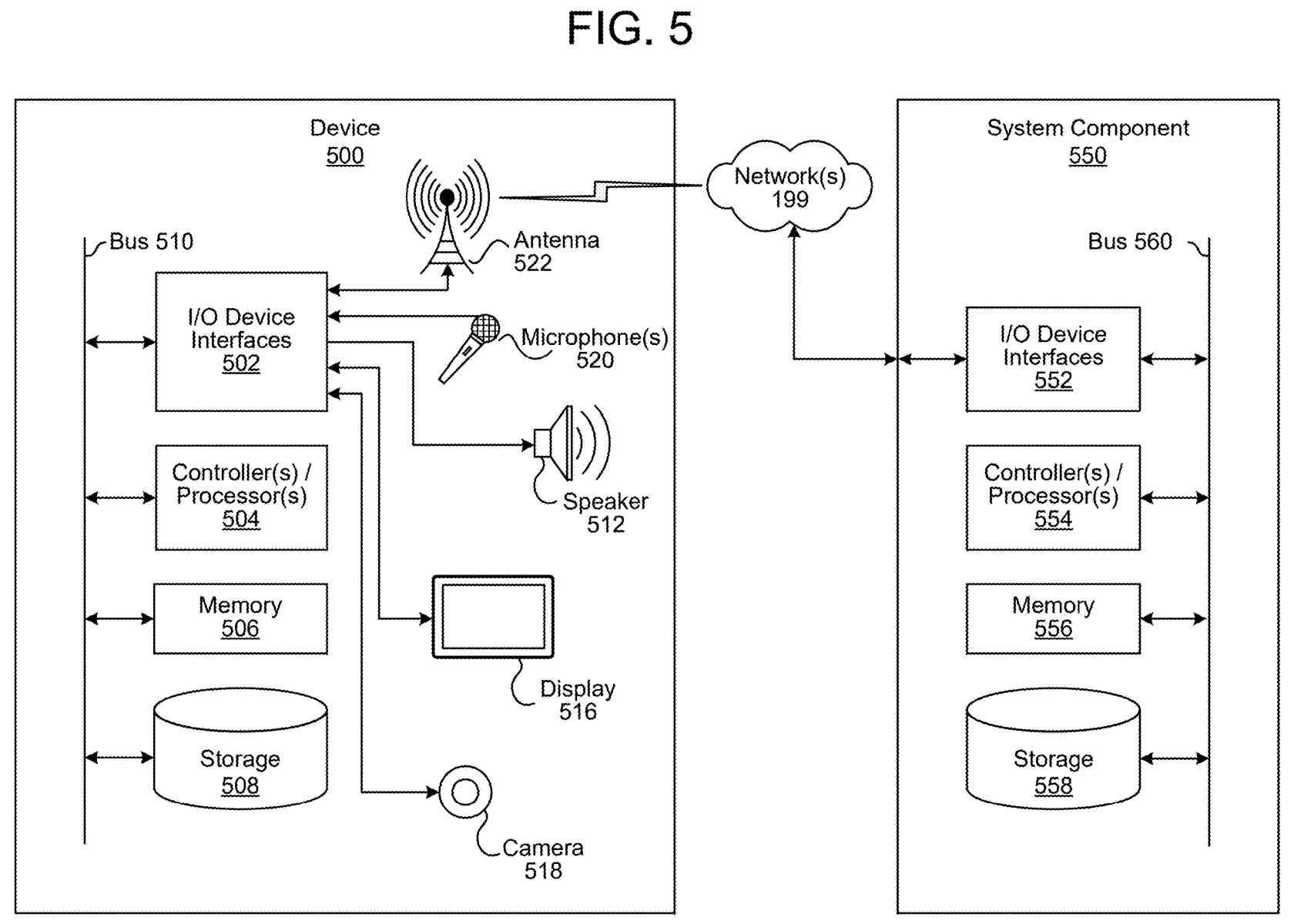

System Component 550

Bus 560

I/O Device Interfaces 552

Controller(s) / Processor(s) 554

Memory 556

Storage 558

Network(s) 199

Device 500

Antenna 522

Microphone(s) 520

Speaker 512

Display 516

Camera 518

I/O Device Interfaces 502

Controller(s) / Processor(s) 504

Memory 506

Storage 508

Bus 510

DELEGATED ACCESS USING VERIFIABLE CREDENTIALS

CROSS-REFERENCE TO RELATED APPLICATION

This application claims the benefit of priority of U.S. Provisional Patent Application No. 63/730,031, filed Dec. 10, 2024, and entitled "Delegated Access for DDIL (denied, degraded, intermittent, and limited) Environments Using Verifiable Credentials (VCs)," the content of which is incorporated herein by reference in its entirety.

BRIEF DESCRIPTION OF DRAWINGS

For a more complete understanding of the present disclosure, reference is now made to the following description taken in conjunction with the accompanying drawings.

FIG. 5 is a block diagram illustrating an example client device and system component communicating over a computer network, according to embodiments of the present disclosure.

DETAILED DESCRIPTION

Figure 1:
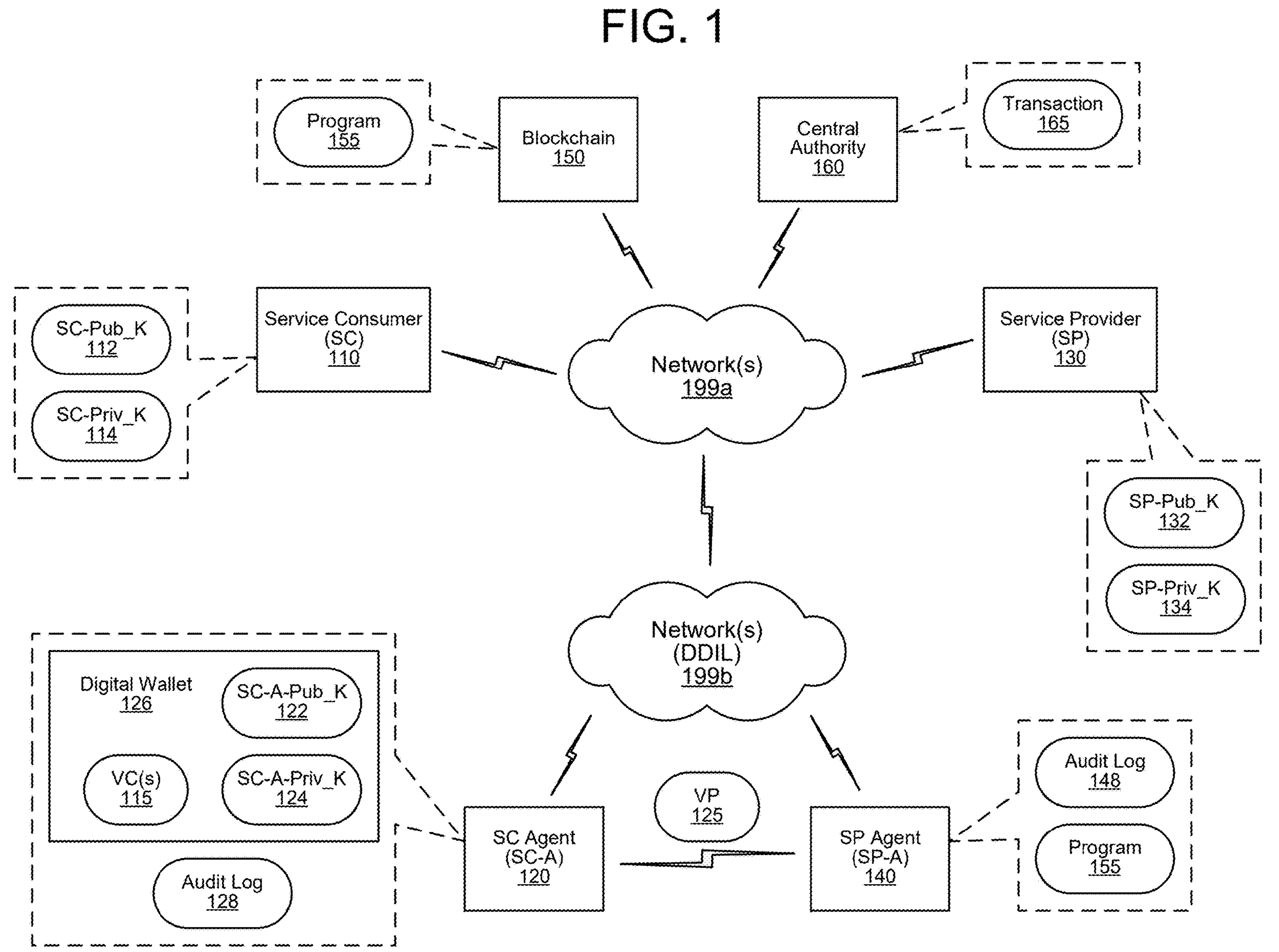
FIG. 1 is a conceptual diagram illustrating delegated access for parties operating in denied, degraded, intermittent, and limited (DDIL) environments using verified credentials (VCs), according to embodiments of the present disclosure.

Parties can use verified credentials (VCs) and cryptography to execute digital transactions. For example, a service consumer can engage with a service provider to purchase a service. The service consumer may prove possession of their VCs to the service provider who, upon verifying the VCs, may provide the requested service. The requested service may include access to data and/or computing resources over a network, and/or may include an exchange of tangible goods such as electricity from an electric vehicle charging station. The parties may use cryptographic keys to secure their communications to, for example, prevent a malicious party from obtaining access to the service by impersonating the service consumer.

In some cases, the service provider and/or service consumer may delegate authority to engage in transactions to an agent. For example, the service consumer may delegate to a service consumer agent, and the service provider may delegate to a service provider agent. The delegation of authority may be limited in scope. For example, the principles (e.g., the service provider and/or service consumer) may authorize their respective agents to provide/procure certain products or services up to a limited monetary value. The principles may have policies that specify the type and/or amount of a transaction the agents may execute, and the principals may agree that they will honor transactions executed by the agents that are within the scope of the delegated authority.

In some cases, the principals may authorize transactions on an individual basis; for example, an agent may send a request for authorization to execute a transaction and enter into the transaction only after receiving authorization. In some cases, however, one or both of the agents may be operating in an environment where they lack a reliable means of communicating with their principal.

Offered herein are systems and methods for enabling secure and autonomous transactions between service providers (SPs) and service consumers (SCs) in environments with intermittent or no internet connectivity. The system utilizes cryptographic credentials and delegated authorization to enable SP agents (SP-As) to make local authorization decisions based on predefined rules and policies. This facilitates real-time transactions without requiring constant communication with a central authority, while ensuring eventual consistency and auditability.

In scenarios where internet connectivity is unreliable or unavailable, traditional authorization mechanisms that rely on real-time communication with a central server can be impractical. This limitation hinders the adoption of autonomous systems and services in various domains, such as mobility, Internet of Things (IoT), and edge computing.

The systems and methods described herein address these challenges by providing a system and method for delegated authorization in disconnected environments. The system enables SPs to delegate authorization capabilities to their agents (SP-As) by issuing cryptographic credentials that encode specific authorization rules and policies. These credentials are stored locally on the SP-As, allowing them to make autonomous authorization decisions based on the predefined rules and/or agreements. On the consumer side, the system enables SCs to delegate authorization to their agents (SC-As) with cryptographic credentials. The SC-A may use the credentials to prove their identity and/or that the SC has delegated authority to the SC-A to engage in certain transactions. The system may also include mechanisms for ensuring eventual consistency and auditability. For example, the SP-A may maintain an audit log of transactions and periodically synchronize it with a central authority when connectivity is available. This can ensure that all transactions are accounted for and can be verified later.

The systems and methods may include one or more of the following features:

- Delegated authorization: SPs can delegate authorization capabilities to their agents (SP-As) using cryptographic credentials.
- Local authorization decisions: SP-As can make autonomous authorization decisions based on predefined rules and policies stored locally.
- Eventual Consistency: SP-As can maintain an audit log and synchronizes it with a central authority when connectivity is available.
- Auditability: Transactions may be logged for later verification.
- Rollback Mechanism: The system may include a mechanism for rolling back transactions in case of rule changes or disputes.

The systems and methods may offer one or more of the following benefits:

- Enable real-time transactions in disconnected environments.
- Reduce reliance on constant internet connectivity.
- Improve autonomy and efficiency of SP agents.
- Ensure eventual consistency and auditability.

Provide a mechanism for rolling back transactions.

The systems and methods may be applied in various use cases. A first use case may involve charging an electric car at an electric charging station. The car owner may be the SC and the SC-A may be an operator of the car or the car itself if it is an autonomous vehicle. The energy provider may be the SP and the charging station may be the SP-A. In a DDIL environment, the energy provider may authorize the charge station to provide an electric charge to a vehicle (e.g., up to a certain dollar value) upon the vehicle or operator demonstrating credentials that correspond to a prior agreement between the car owner and the energy provider, even if the charge station cannot obtain authorization from the energy provider at the time the vehicle/operator requests the charge. The charging station may log the transaction (e.g., the amount of energy provided and the cost), and send data regarding the transaction to the energy provider and/or the central authority when network connectivity becomes available again. The energy provider and car owner may reconcile their accounts. The system may maintain an auditable record of transactions, and if there is an issue with a particular transaction—for example, one of the agents exceeded its prior authorization—the system can provide a mechanism to rollback any affected transactions.

A second use case may involve an artificial intelligence (AI) model (e.g., running in a container) and an Internet of Things (IoT) device. The SP may be a software as a service (Saas) provider with an IoT service, and the SC may be an individual registered with the SaaS service to use an IoT device belonging to the service. The SC-A may be an AI model operated by the individual and which may operate and/or receive data from the IoT device. The SaaS service may authorize the IoT device to perform certain actions in response to requests from an AI model that can validate itself as an authorized requestor. The IoT device may log the request and response, and send it to the SaaS provider for reconciliation. Other use cases may involve vending machines; point-of-sale (PoS) or self-checkout systems on ferries, cruise ships, planes, trains, etc.; autonomous taxis; and so on.

A third use case may involve the distribution of funds or benefits. For example, the principals may be a health insurance provider and a hospital, clinic, or pharmacy organization. The agents may be patients/consumers and points of sale at pharmacies, clinics, or hospitals. The insurance provider and healthcare organization may agree on the circumstances for delegating authorization to patients and healthcare points of sale for conducting certain transactions when real-time communication with the principals is not always feasible. A patient may present their device (e.g., a mobile phone, payment card, etc.) holding their cryptographic credentials to the point-of-sale device, which may execute a transaction for the requested prescription, service, etc. upon verification of the credentials.

Various other use cases of the described system are possible. These features may be used alone or in combination with each other and/or other features described herein. Various operations of the systems and devices may be subject to user approval. The system may be implemented in a manner that ensures compliance with applicable laws, regulations, standards, etc., in the region(s) where the user, devices, and/or systems are located.

FIG. 1 is a conceptual diagram illustrating delegated access for parties operating in DDIL environments using VCs, according to embodiments of the present disclosure. The parties may include principals such as a service consumer (SC) 110 and a service provider (SP) 130, and their respective agents such as a service consumer agent (SC-A) 120 and a service provider agent (SP-A) 140. In some cases, a principal may have multiple agents. For example, the SC 110 may have a fleet of autonomous vehicle SC-As 120, and the SP 130 may operate multiple charging station SP-As 140. While the SC 110, SC-A 120, SP 130, and the SP-A 140 are discussed as parties to agreements and transactions, operations attributable to them may be performed by a device 500 or system component 550 as described in FIG. 5. For example, in some use cases the SC-A 120 may be a vehicle (e.g., with an integrated computer), an SP-A 140 may be a charging station, while the SC 110 and the SP 130 may be servers in communication with their respective agent devices over one or more computer networks 199. If the vehicle has an operator, the SC-A 120 may correspond to a device 500 (e.g., mobile phone) or a smart card (e.g., a payment card with an embedded integrated circuit) of the operator.

The computer networks 199 may include one or more a local-area networks (LAN), wide-area network (WAN), the Internet, etc. The networks 199*a* and 199*b* may represent individual and/or interconnected communication networks over which different devices and/or system components send and/or receive data via wired/wireless/optical connections. As used herein, the network 199*a* indicates communication links that are generally reliable in that devices and system components communicating via the network 199*a* receive data with relatively low latency, high bandwidth, and/or relatively few dropped packets or other interruptions. In contrast, as used herein, the network 199*b* may indicate communication links that may be unreliable, sporadic, high-latency and/or low-bandwidth, prone to outages, and/or available on a limited schedule. Example networks 199*b* may include, for example, wireless mesh networks, long range wide-area networks (LoRa), Long-Term Evolution Machine Type Communication (LTE-M) networks, and/or networks made of wired or wireless connections such as Bluetooth Low Energy (LE), satellite links, etc. Limitations of the network 199*b* may manifest due to power outages, inclement weather, interference from other devices, overcrowded communication channels, and/or various other causes. Thus, devices and/or system components communicating over such networks 199*b* may be said to be operating in a DDIL environment.

To enable the agents to engage in transactions in an environment where the connections to one or more of the principals is not immediately available, the system may use a combination of VCs and various cryptographic keys generated by the parties.

The cryptographic keys may be public-private key pairs generated by the parties. The parties may use a cryptographic algorithm to generate a pair of long, mathematically related random numbers. One number will be the party's private key, and the other will serve as a public key that a relying party (e.g., one of the other parties) can use to verify a digital signature corresponding to the private key, and thus the identity of the signing party.

For example, the SC 110 may have or generate a cryptographic key pair consisting of an SC public key SC-Pub_K 112 and a corresponding SC private key SC-Priv_K 114. The SP may have or generate an SP public key SP-Pub_K 132 and an SP private key SP-Priv_K 134. And the SC-A may have or generate a public key SC-A-Pub_K 122 and a private key SC-A-Priv_K 124.

The parties may use the keys to generate a verified credential (VC) 115 for use in authenticating transactions. A VC 115 may include a piece of data such as an electronic document signed with a party's private key. For example, when the SC 110 and the SP 130 agree to delegate authorization to their respective agents to engage in transactions, the SC 110 may give the SP 130 the public key corresponding to the SC-A 120 (SC-A-Pub_K 122). The SP 130 may sign a document containing the public key of the SC-A 120 with its private key (SP-Priv_K 134). The SC-A 120 can then use the VC—that is, the digitally signed document containing SC-A-Pub_K 122—to demonstrate that it has been delegated authority as an agent of the SC 110 to engage in transactions between the SC 110 and the SP 130.

The SC-A 120 may include a digital wallet 126. The digital wallet 126 may include software and/or hardware on the SC-A 120 configured to perform secure electronic transactions. The digital wallet 126 may generate cryptographic key pairs such as the SC-A-Pub_K 122 and the SC-A-Priv_K 124, as well as other cryptographic keys such as passkeys. The digital wallet 126 may include or use secure (e.g., encrypted) storage to maintain the keys. The digital wallet 126 may also obtain and securely store VCs 115 from the SP 130 (e.g., via the SC 110). In some implementations, the digital wallet 126 may also store an electronic record of transactions the SC-A 120 has executed. In various implementations, SC-A 120 may store the audit log 128 in the digital wallet 126 or separately from the digital wallet 126 and in addition to records maintained by the digital wallet 126.

When the SC-A 120 and the SP-A 140 meet, the SC-A 120 can request a transaction by signing the VC 115 with its own private key (SC-A-Priv_K 124) to generate a verifiable presentation (VP) 125. The VP 125 demonstrates that the SC-A 120 possesses the private key corresponding to the public key that has been signed by the SP 130. The SP-A 140 can use the SP-Pub_K 132 to verify that the VC 115 has been signed using the SP-Priv_K 134. The SP-A 140 can use the SC-A-Pub_K 122 in the VC 115 to verify that the SC-A 120 has signed the VP 125. The SP-A 140 can then trust that the SC-A 120 is who it says it is, and that the SP 130 has agreed to allow the SC-A 120 to engage in transactions between the SC 110 and the SP 130.

In some case, a VC 115 may include other information such as a document, issued by a trusted issuer, attesting to a party's identity and/or attributes. The trusted issuer may be a system or systems that act as, for example, a certificate authority. A certificate authority (or certification authority) may be an entity that stores, signs and/or issues digital certificates. A digital certificate may certify ownership of a public cryptographic key by a named subject of the certificate. The digital certificate may allow relying parties to rely upon the signature and/or on an assertion made about the private cryptographic key that corresponds to the certified public key. Thus, the trusted issuer may act as a third party that is trusted by holder (e.g., subject) of the certificate and by the other parties relying on the certificate (e.g., an agent). In various implementations, the trusted issuer may include a decentralized identifier (DID) registry, a government agency, a financial institution, etc.

The trusted issuer may generate trusted issuer identity documents (e.g., issuer DID documents). The trusted issuer identity document may specify the trusted issuer's identity (e.g., DID), public cryptographic key(s), and/or information about the types of credentials the trusted issuer is authorized to issue. The trusted issuer may send the trusted issuer identity documents to a registry for storage and later retrieval by the parties.

In some implementations, the parties may leverage a distributed ledger such as a blockchain 150 to, for example, store a program 155 (or a hash of the program) which may be used to verify a transaction request. A distributed ledger may represent a shared, replicated, and synchronized data store. A distributed ledger system may include a plurality of distributed nodes that maintain copies of data. A node may include hardware and/or software configured to receive data to add to the distributed ledger an implement a consensus algorithm to ensure the data stored by the distributed nodes is reliably replicated among them. The consensus algorithm is used to determine the correct updated ledger to represent the addition of the new data to the distributed ledger (e.g., the blockchain 150). Distributed nodes may form a peer-to-peer network (e.g., within and/or across the computer network(s) 199*a* and/or 199*b*) to propagate updates once the correct updated ledger is determined. Each distributed node will then update itself accordingly. The result is a tamper resistant record of the received data replicated across multiple nodes and without a single point of failure.

The distributed ledger may be a linear data structure (e.g., a chain such as blockchain) or a more complex structure like a directed acyclic graph. A directed acyclic graph in the context of a distributed ledger may be made up of blocks of data and edges indicating adjacency of data blocks added to the distributed ledger. Each edge is directed, indicating a direction from an existing data block to a new data added to the existing data block. The structure is acyclic in that it contains no paths by which a data block can be crossed twice by traversing any sequence of edges according to their direction (e.g., no edges are directed "backwards" in time). A data block may, however, have multiple edges directed to it and/or away from it.

The consensus algorithm may be a proof-of-work algorithm or a proof-of-stake algorithm. A proof-of-work algorithm is a form of cryptographic proof a party can use to prove to others that it has performed a certain about of computational work. The proof is asymmetric in that a verifier may confirm the proof with minimal computational effort. An example of proof-of-work in the context of distributed ledgers is "mining" for cryptocurrency, where mining refers to the incentive structure used to encourage nodes to expend computational effort to add data blocks to the distributed ledger. In contrast, proof-of-stake protocols only allow nodes owning some quantity of data blocks (e.g., blockchain tokens) to validate and add new data blocks. Proof-of-stake protocols prevent attackers from hijacking validation by requiring an attacker to acquire a large proportion of data blocks. Proof-of-stake protocols include, for example, committee-based proof of stake, delegated proof of stake, liquid proof of stake, etc.

Distributed ledgers may be permissioned or permissionless. A permissioned distributed ledger may refer to a private system having a central authority for authorizing nodes to add data blocks. In some cases, a consortium may agree to operate a distributed ledger jointly among the participating organizations while excluding others. A permissionless distributed ledger may refer to an open or public network for which no access control is used. Any party may add to the distributed ledger, provided they satisfy the consensus algorithm (e.g., proof of work). An example of a permissionless distributed ledger is bitcoin and other cryptocurrencies that require new entries to include a proof of work.

In implementations in which VCs are issued by a trusted issuer, the distributed nodes may be open (e.g., viewable by the public) to allow an observer to see which VCs correspond to which trusted issuers and which VCs are valid, revoked, or expired. In some implementations, the distributed nodes may be private, prevented unauthorized observers from seeing the VCs.

When the SC-110 and the SP 130 enter into an agreement to delegate authorization to their respective agents to execute transactions on their behalf, the SP 130 may construct a program 155 that the SP-A 140 and/or the central authority 160 may use to verify a transaction request or a previously executed transaction. The program 155 may correspond to the particular action requested by the agent. For example, a first program may correspond to a particular service, and a second program may correspond to a particular product. In an example in which the SP-A 140 is a fueling/charging station, the SP 130 may generate different programs for electric charging versus gasoline versus other products/services offered. A program 155 may be configured to verify cryptographic keys and identities as well as other parameters of the transaction request such as amount (e.g., in dollars), a cumulative amount over multiple transactions within a particular period of time, the time of day/week/year/etc. The program 155 may take as input the VC or VP and the parameters of the requested transaction, if applicable. The program 155 may return an output, which may be a Boolean (e.g., "TRUE" or "FALSE") indicating whether the transaction request should be allowed or denied.

In various implementations, the program 155 may be public (e.g., stored on the blockchain 150) or private (e.g., delivered to the SP-A 140 and/or the central authority 160 via secure means). If the program 155 is kept private, the SP 130 may store a hash of the program on the blockchain 150, and parties (e.g., the SP-A 130 or others) may use the stored hash to verify local versions of the program 155 that the parties may use to verify transaction requests. Storing the program 155 itself on the blockchain 150 may improve the transparency of the rules/requirements regarding delegated authorizations; however, storing the program publicly may create an opportunity for a nefarious actor to attempt to reverse engineer the program 155 to determine how to spoof a seemingly valid transaction request from an unauthorized device. The SP-A 140 may receive a transaction request from an SC-A 120 and use the program 155 to verify the request. The SP-A 140 may identify the action requested (e.g., the service/item to be purchased), and use the action to identify the particular program 155 to use for verification. The SP-A 140 may have previously received the program 155 from the blockchain 150 or directly from the SP 130. In some cases, the SP-A 140 may retrieve (or attempt to retrieve) the program 155 upon receiving the execution request, but due to the DDIL nature of the environment in which the agents operate, the SP-A 140 may be configured to rely on its local knowledge. In some cases, the blockchain 150 may store a hash of the program 155, which the SP-A 140 may use to verify a program received from elsewhere. Upon identifying the program 155, the SP-A 140 may execute the program 155 with the parameters of the transaction. The parameters may include the identity of the requestor (the SC-A 120) and the amount of the transaction. The program 155 may return a Boolean value (e.g., true/false) indicating that the transaction is allowed/not allowed.

In some implementations, the SP 130 may construct the program and store the program 155 itself on the blockchain 150. The SP-A 140 may retrieve the program 155 when network connectivity is available. In some cases, the SP 130 may send the SP-A 140 a notification that a new program 155 is available. In some cases, the SP 130 may store a hash of the program on the blockchain 150. Thanks to the immutable nature of data stored on the blockchain 150, the SP-A 140 can trust that a program 155 retrieved from the blockchain 150 is legitimate and unmodified and/or use a hash retrieved from the blockchain 150 to verify a program 155 received from another source. In some implementations, storing only the program hash on the blockchain 150 may increase the security of the system.

In some implementations, the transaction request may include a zero-knowledge proof (ZKP). The ZKP may allow the SC-A 120 to request a transaction, and the SP-A 140 to verify the request, without the SC-A 120 publicly identifying itself or divulging any of its attributes. The SP-A 140 may use the program 155 to verify the ZKP. A zero-knowledge proof allows a party to prove a claim without revealing any additional information. For example, a "prover" can share a proof of the claim with a "verifier" who can verify the accuracy of the proof. A zero-knowledge proof may not prove the claim with certainty, but the acts of proving and verifying may be repeated until the prover demonstrates to the verifier (and, in some case, an external observer or observers) a sufficiently high statistical likelihood that the claim is true, rather than a series of lucky guesses.

A zero-knowledge proof of a claim may satisfy three properties: completeness, soundness, and zero-knowledge. Completeness means that if the claim is true, an honest prover can convince an honest verifier of the claim. Soundness means that if the claim is false, no cheating prover can convince an honest verifier of the claim (e.g., except for some very small probability, which may be reduced by further iterations of proof). Zero-knowledge means that if the claim is true, no verifier (or observer) will learn anything other than the fact that the claim is true.

A zero-knowledge proof may be interactive or non-interactive. An interactive proof system may involve a repeated exchange of messages between the prover (e.g., the SC-A 120) and the verifier (e.g., the SP-A 140). In an interactive proof system, it may be assumed that the prover has access to abundant computational resources but cannot be trusted. In contrast, the verifier may be assumed to be trustworthy but have limited computational resources. The interactive proof system may also involve an ability of the verifier to make random choices. Through an exchange of messages, the prover may establish a near-certain likelihood that its claim is true, without divulging any information beyond the fact of the truth of the claim. For example, the verifier may determine that receiving N consecutive verifiable proofs from a prover makes the probability that the prover is asserting a false claim exceedingly low. The verifier may select a value of N and/or a threshold confidence score (e.g., corresponding to a likelihood that the prover possesses the credentials it asserts) based on, for example, the potential harm of a bad actor accessing the requested resource or action. An example of a zero-knowledge protocol that may be used to perform an interactive zero-knowledge proof is a zero-knowledge Scalable Transparent Argument of Knowledge (zk-STARK); however, some versions of zk-STARK may operate non-interactively.

A non-interactive zero-knowledge proof may offer advantages over interactive proofs. For example, a non-interactive proof may be used when the prover and verifier cannot interact (e.g., communicate in real time). Thus, non-interactive proofs may be useful in decentralized systems such as a distributed ledger system made up of the distributed nodes. The distributed nodes may use the zero-knowledge proof to verify transactions (e.g., adding new policies to the ledger) without oversight of a central authority. For example, a distributed node may verify that a party (e.g., the SP 130) is authorized to write policies, public keys, and/or other data to the blockchain 150. An example of a non-interactive zero-knowledge protocol is a zero-knowledge Succinct Non-interactive Argument of Knowledge (zk-SNARK). A zero-knowledge proof protocol (e.g., such as zk-SNARK, zk-STARK, and/or others) may be transparent and/or universal. A transparent protocol is one that does not require a trusted setup but may rely on public randomness. A universal protocol is one that does not require a separate trusted setup for each arithmetic circuit, where an arithmetic circuit represents a directed acyclic graph involving the addition and/or multiplication of numbers; for example, to compute a polynomial.

In some implementations, the SP 130, a trusted issuer, and/or other entity may provide a trusted setup for the zero-knowledge proof. For example, in some implementations, the SP 130 may send prover setup to the SC-A 120 via the SC 110, and verifier setup to the SP-A 140 (e.g., directly or via the blockchain 150). The prover setup and the verifier setup may be collectively referred to as a "trusted setup". In some implementations, the prover setup may be data representing, for example, a prover key and/or a structured reference string. In some implementations, the verifier setup may be data representing, for example, a verifier key and/or a structured reference string. The trusted setup may facilitate the zero-knowledge proof between the SC-A 120 (e.g., the prover) and the SP-A 140 (e.g., the verifier). The agents may use the zero-knowledge proof to establish that the SC-A 120 possesses a VC that correspond to delegated authorization to engage in transactions with the agents of the SP 130. By using the zero-knowledge proof, the SC-A 120 may keep their exact identity and/or attributes hidden from the SP-A 140 and/or any observer(s) of the data that passes between the agents. An observer may, however, be permitted to witness the operation(s) performed and/or the results thereof; for example, the program 155 and the result. This may allow the observer to see that the transaction was properly authorized/verified; thus balancing the interests of privacy for the SC-A 120 and trust on the part of the observer.

In some implementations, the SP 130 (and/or a trusted issuer) may provide VCs corresponding to the SC-A 120 to the SC 110. The VCs may correspond to one or more attributes about (or assigned to) the SC-A 120. For each attribute ("att"), the SP 130 may send to the SC-A 120 (e.g., via the SC 110):

$$\sigma_{att}=\text{sign}_{pk(IdP)}(att\|pk_{Requestor})$$

The SC-A 120 may wish to prove a claim c about an attribute; for example, that the SC-A 120 has been delegated authorization by the SC 110 to engage in certain transactions with agents of the SP 130, SC-A 120 is over the age of 18, the SC-A 120 is a member of organization ABC, the SC-A 120 carries a U.S. passport, etc. As can be appreciated, a number of claims/attributes are possible. The SC-A 120 may prove to the SP-A 140 that c (att) is true, that the SP 130 certifies that the SC-A 120 has the attribute att, and that att was signed (e.g., that att was used to assert claim c).

The SC-A 120 may receive the prover setup from the SC 110, the blockchain 150, or elsewhere. The prover setup may represent a prover key for the corresponding claim $PK_{IdP,c}$ and a structured reference string $SRS_{IdP}$.

Using the prover setup, the SC-A 120 may build the following proof:

$$P_{att,Requestor,IdP}=\text{Proof}(\sigma_{att}\text{ is valid and }c(att)==\text{true}, PK_{IdP,c}, SRS_{IdP})$$

Which verifies that:

$$\text{verify}(\sigma_{att}, att\|pk_{Requestor})==\text{true and }c(att)==\text{true})$$

The SC-A 120 may send the proof $P_{att,Requestor,IdP}$ with or as part of the transaction request to the SP-A 140. The SP-A 140 may fetch the verifier setup from the blockchain 150 (or rely on a previously-obtained version). The verifier setup may represent a verifier key for the corresponding claim $VK_{IdP,c}$ and a structured reference string $SRS_{IdP}$. The SP-140 may then verify the proof P from the SC-A 120:

$$\text{Verify}(P_{att,Requestor,IdP}, VK_{IdP,c}, SRS_{IdP})==\text{valid}$$

If the claim c accurately represents the VC(s), the proof P will establish that c(att) is true and/or that att was properly assigned to the SC-A 120. The SP-A 140 may then allow the requested transaction and proceed with execution.

Thus, in some implementations, the ZKP may be the public key of the SC-A 120 (e.g., the SC-A-Pub_K 122) signed by the private key of the SP 130 (e.g., the SP-Priv_K 134). By using this ZKP, the SC-A 120 need not include its actual identity/attributes in the transaction request. Rather, the SC 110 and the SP 130 can establish the identity/attributes of the SC-A 120 during registration, and the SP 130 can provide the SC-A 120 with a VC 115 to use when making transaction requests. The SP 130 can then write to the blockchain 150 a program 155 that SP-As 140 may use to verify transaction requests. The SC-A 120 can then validate itself with the SP-A 140 without divulging its identity or attributes.

Once the SC-A 120 and the SP-A 140 have executed, they may record the transaction in their respective audit logs 128 and 148. When they are able, the agents may upload the transaction records to a central authority 160. The upload(s) may occur on a set schedule or whenever connectivity is restored; for example, when one or both of the agents return to a base of operations and/or when network conditions improve. The central authority 160 may be a third party that the SC 110 and the SP 130 have agreed to use as an intermediary—e.g., an auditor—to audit transaction records, settle accounts, and roll back transactions deemed invalid due to an intervening rule change. The central authority 160 may maintain records of the transactions 165 uploaded by the SC-A 120 and/or the SP-A 140. The central authority 160 may settle transactions deemed valid and roll back transactions deemed invalid. In some cases, the central authority 160 may allow one or both principals the option of requesting a reinitiation of a rolled-back transaction. The central authority 160 may have a fiduciary responsibility to the principals and/or may be subject to regulations related to financial dealings. In some implementations, the central authority 160 may correspond to an organization formed by, and in some cases including, representatives of one or both of the principals; for example, a consortium of interested parties such as a holding company owned by group of consumers or other stakeholders. In some implementations, the central authority 160 may be a payment network (e.g., including a traditional bank or a self-executing "smart contract" on a blockchain), a government organization, etc.

Figure 2A:
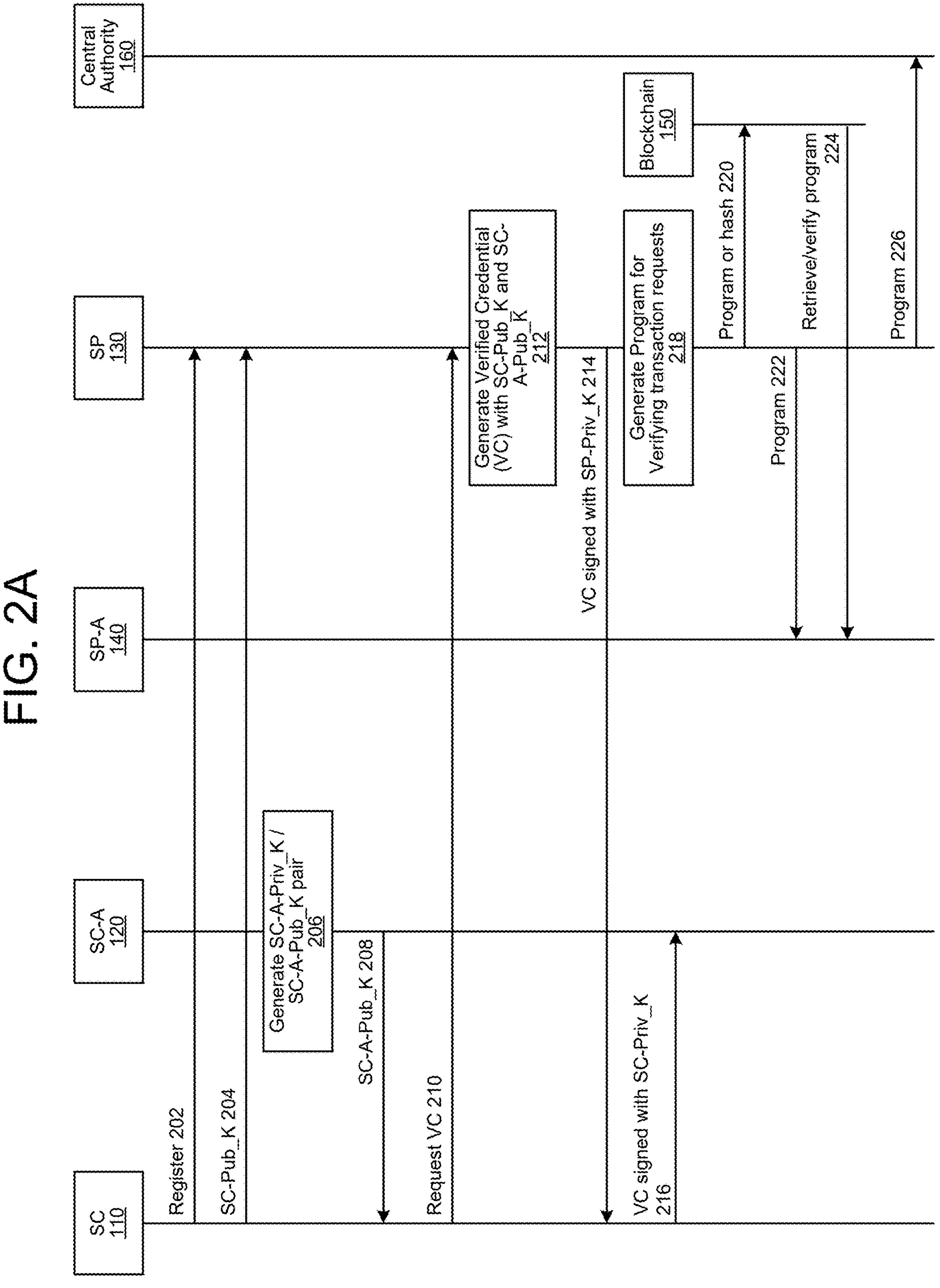
FIGS. 2A through 2C are signal flow diagrams illustrating example operations of delegating access in a DDIL environment, according to embodiments of the present disclosure.
Figure 2B:
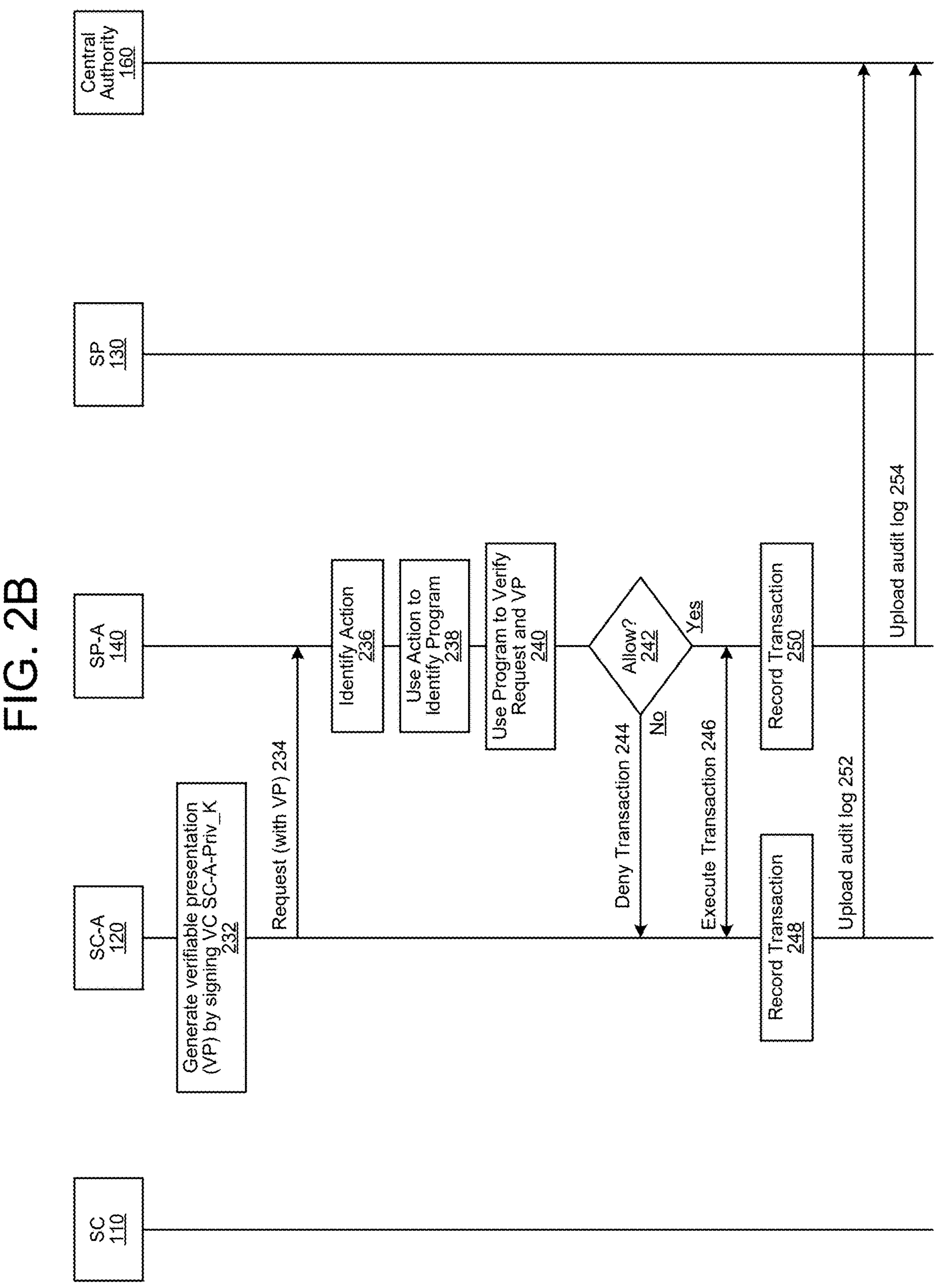
Figure 2C:
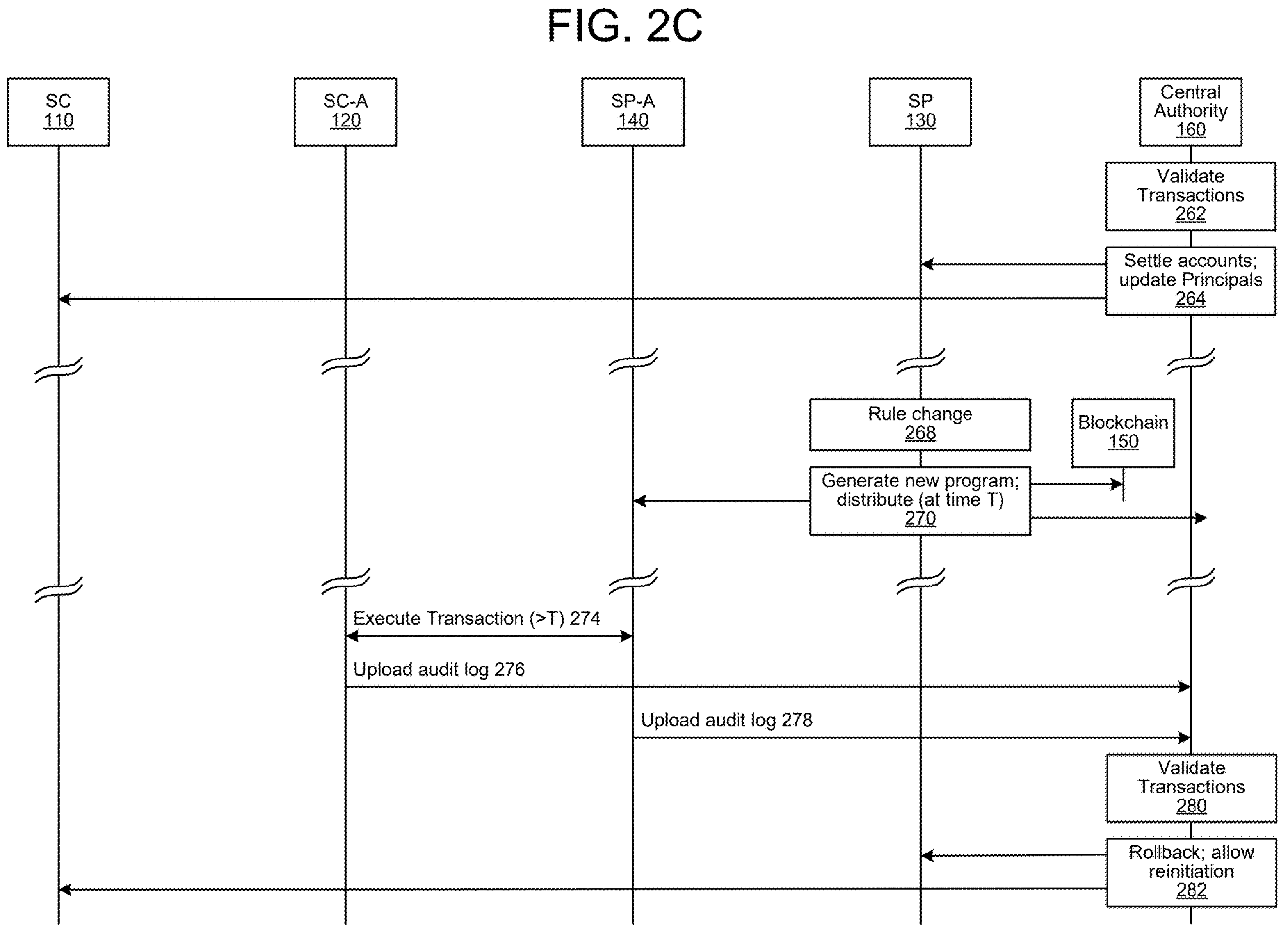

FIGS. 2A through 2C are signal flow diagrams illustrating example operations of delegating access in a DDIL environment, according to embodiments of the present disclosure. FIG. 2A illustrates example setup operations between the parties and their respective agents, FIG. 2B illustrates example operations of executing a transaction between agents, and FIG. 2C illustrates example an SC 110, and SC-A 120, an SP 130, an SP-A 140, and in some implementations a distributed ledger system like a blockchain 150. The connections between the SC 110 and the SC-A 120, and/or the SP 130 and the SP-A 140, respectively, may be denied, degraded, intermittent, and limited. The SC-A 120 and the SP-A 140 may, however, engage in a transaction based on authorizations delegated to them by the SC 110 and the SP 130, respectively.

Beginning in FIG. 2A, the SC 110, SP 130, SC-A 120, and SP-A 140 may exchange cryptographic keys and credentials to establish trust among the parties. At step 202, the SC 110 may register with the SP 130. Registration may include negotiating and/or agreeing to various terms for engaging in future transactions, including with regard to authorizations to be delegated to their respective agents SC-A 120 and SP-A 140. As part of the registration process, at step 204, the SC 110 may identify themselves to the SP 130 using a service consumer public key (SC-Pub K). The SC-Pub_K may enable the SP 130 to verify that a particular communication originated from the SC 110.

At step 206, the SC-A 120 may generate a service consumer agent public/private key pair (SC-A-Pub_K/SC-A-Priv_K). The SC-A 120 may use the keys later to prove its identity to an SP-A 140. At step 208, the SC 110 may receive the SC-A-Pub_K from the SC-A 120. The SC 110 may use the SC-A-Pub_K to tell other parties to trust that the holder of the corresponding private key (SC-A-Priv_K) has received delegated authorization from the SC 110 to act on behalf of the SC 110; for example, to engage in certain transactions.

At step 210 the SC 110 may send a request for credentials to the SP 130. The request may include the SC-A-Pub_K. At step 212, the SP 130 may generate a VC using SC-A-Pub_K and signed with the SP-Priv_K. For example, the SP 130 may use SP-Priv_K to digitally sign an electronic document that contains the SC-A-Pub_K. In some implementations, the electronic document may also include the SC-Pub_K (e.g., received at step 204). The signed document containing the SC-A-Pub_K and/or the SC-Pub_K become the VC. The SC-A 120 may eventually use the VC to generate a VP that (a) demonstrates that the SC-A 120 is acting on behalf of the SC 110 based on the VC containing the SC-A-Pub_K, (b) demonstrates that the SP 130 has agreed to the SC-A 120 acting as an agent of the SC 110 based on the VC signature corresponding to SP-Pub_K, and (c) proves identity of the SC-A 120 based on the VC containing the SC-A-Pub_K provided to the SP 130 by the SC 110. The SP 130 may return the signed VC to the SC at step 212, and the SC 110 may send the signed VC to the SC-A 120, at step 216. In some implementations, the SC 110 may sign the VC with the SC-Priv_K to establish authenticity of the VC to the SC-A 120 and, in some cases, to the SP-A 140.

In some implementations, the SP 130 may, at step 218, generate a program for verifying transaction requests. The program may allow the SP-A 140 and/or the central authority 160 to determine whether a requested transaction or previously executed transaction is allowed or not (e.g., based on the parameters of the transaction and/or the VP provided).

In some implementations, the SP 130 may, at step 220, store a program (or a hash of the program) in a distributed ledger such as the blockchain 150. Additionally or alternatively, the SP 130 may, at step 222, send the program to the SP-A 140 directly or indirectly. At step 224, the SP-A 140 may retrieve the program from the blockchain 150 and/or validate a hash of the program against a hash stored on the blockchain 150. The SP-A 140 may subsequently use the program to validate a request/VP from an SC-A 120. In some implementations, the SP-A 140 may retrieve or verify the program periodically (e.g., on a schedule of once per week, month, quarter, etc.). In some implementations, the SP-A 140 may retrieve or verify the program when the SP 130 pushes changes (e.g., changes to rules, party identities and/or keys, etc.). In some implementations, the SP 130 may, at step 226, send the program to the central authority 160 for use in verifying previously executed transactions; for example, to determine whether a transaction is valid and should be settled, or invalid and should be rolled back.

Continuing with FIG. 2B, SC-A 120 and SP-A 140 meet and commence a transaction. The agents may use the previously exchanged cryptographic keys and credentials to execute the transaction, after which the principals may use audit logs from the agents to settle accounts. At step 232, the SC-A 120 may use the signed VC (e.g., generated at step 212 and received via steps 214 and 216) to generate a VP to include with request for service (and/or a product) from the SP-A 140. The SC-A 120 may sign the VC with the SC-A-Priv_K (e.g., generated at step 206) to create the VP. At step 234, the SC-A 120 may send the request and the VP to the SP-A 140.

The request may include an indication of an action (the requested service/product) and an identity. The identity may be represented in the VP by the SC-A-Pub_K (which has been signed using the SP-Priv_K) and used to verify the digital signature on the VP. At step 236, the SP-A 140 may identify the requested action. At step 238, the SP-A 140 may use the action to identify a program (e.g., previously received from the SP 130 and/or blockchain 150) for verifying the request. At step 240, the SP-A may use the program to verify the request; for example, by verifying the identity of the SC-A 120, authenticating the various digital signatures on the VC/VP, determining the parameters of the request (e.g., the action/amount), and or determining that the requested transaction action is otherwise valid under the agreement between the SC 110 and SP 130 as represented in the program.

Based on the result of the verification, the SP-A 140 may, at step 242, determine whether to allow or deny the transaction. If the SP-A 140 determines the request is not valid, it may, at step 244, deny the request and send a notification to the SC-A 120 accordingly. If the SP-A 140 verifies the request, it may, at step 246, execute the transaction with the SC-A 120 by performing the action (e.g., providing the requested service and/or product). At step 248, the SC-A 120 may record the transaction in its audit log and upload the audit log to the central authority 160 at step 252. At step 250, the SP-A 140 may record the transaction in its audit log and upload the audit log to the central authority 160 at step 254. The agents may upload the audit logs (e.g., at step 252 and 254) sometime after the agents execute the transaction. The upload(s) may occur on a set schedule or whenever connectivity is restored; for example, when one or both of the agents return to a base of operations and/or when network conditions improve.

Continuing with FIG. 2C, the principals download the transactions executed by the agents and settle accounts. Occasionally there may be a rule change, and if any transactions occur after the time of the rule change that do not conform to the new rule—for example, due to one or both of the agents not receiving a rule update prior to allowing a transaction—the principals may roll back the transactions.

At step 262, the central authority 160 may process the transaction records (e.g., received at steps 252 and 254) and determine whether the transactions are valid. Assuming in this case that all transactions conform to the current agreement between the principals, the central authority 160 may, at step 264, settle accounts between the SC 110 and SP 130 (e.g., by transferring funds between accounts corresponding to the respective principals for services rendered and/or products exchanged in the valid transactions).

At step 268, at a time T, the SP 130 (and/or the SC 110) may enact a rule change that alters the conditions under which the SP-A 140 may execute a transaction. At step 270, the SP 130 may generate a new program reflecting the rule change, and, at a time T, distribute the new program to the SP-A 140, the central authority 160, and/or the blockchain 150 (e.g., in a manner similar to the steps 220 to 226).

At step 274, and after time T, the agents may execute transactions as before. In this case, however, the SP-A 140 may not have received the new program, and may have granted requests for transactions that may have been valid under the previous rule/program but are invalid under the new rule/program. The SC-A 120 and SP-A 140 may upload their respective audit logs at steps 276 and 278. At step 280, the central authority 160 may attempt to validate the transactions based on the rule/program that was in effect at the time of the transactions. The central authority 160 may determine that the one or more of the recent transactions are invalid under the new rule/program. In response, the central authority 160 may, at step 282, rollback the transactions (e.g., by treating them as having not executed and not transferring funds between accounts). The central authority 160 may, however, allow the SP 130 and the SC 110 to reinitiate the transactions, thereby completing executing of the transactions after the fact. If, however, the principals do not agree on whether to reinitiate a particular transaction, the principals may appeal to the central authority 160 or other third party to mediate the disagreement. Various steps illustrated in FIGS. 2A through 2C may be repeated for additional rule changes and transactions.

Figure 3:
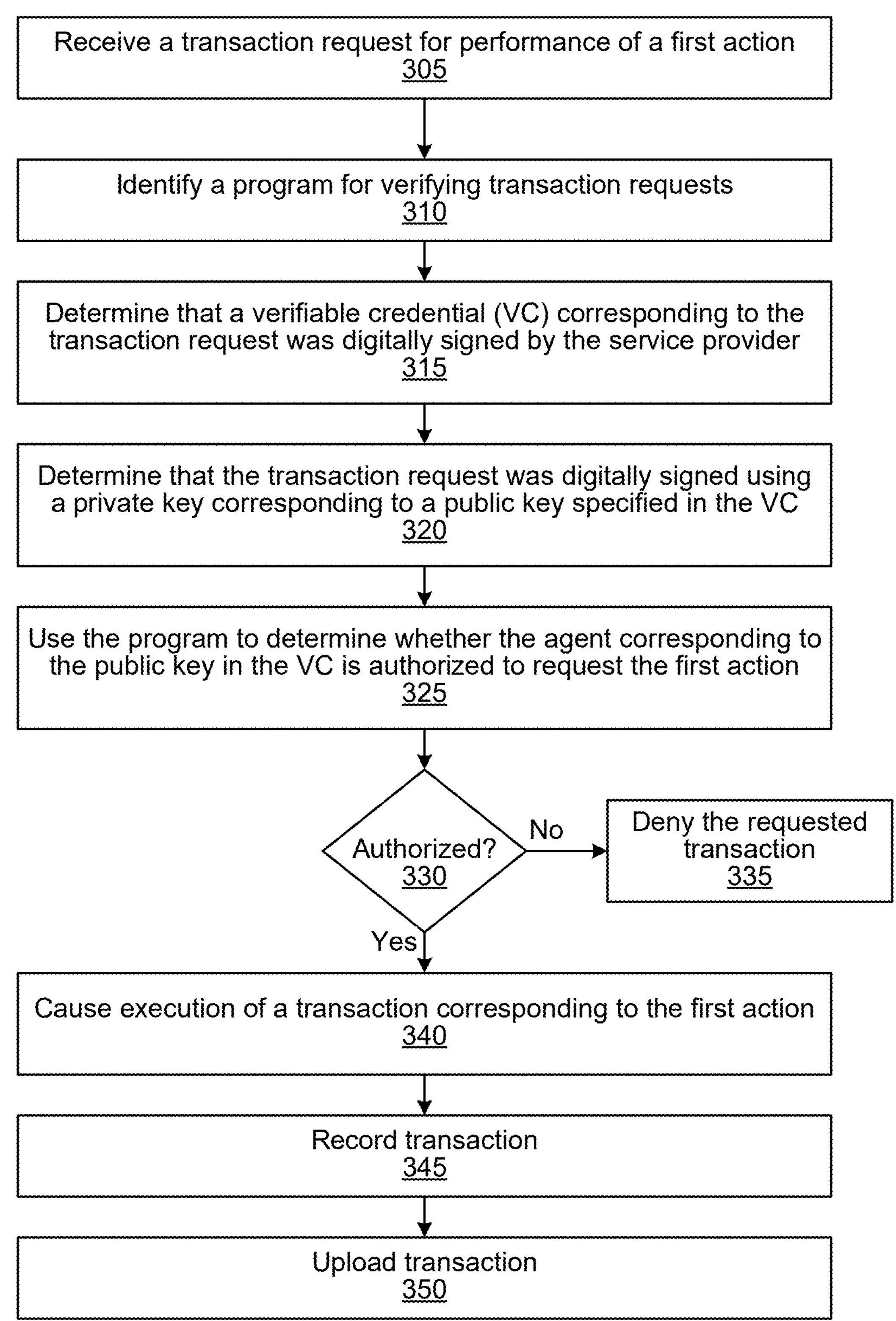
FIG. 3 is a flowchart illustrating an example method of a service provider agent verifying a request from a service consumer agent and performing the requested action, according to embodiments of the present disclosure.

FIG. 3 is a flowchart illustrating an example method 300 of an SP-A 140 verifying a request from a SC-A 120 and performing the requested action, according to embodiments of the present disclosure. The method 300 may include receiving (305), by a first device corresponding to the SP-A 140 of the SP 130, from a second device corresponding to the SC-A 120 of the SC 110, a first request corresponding to a first action, the first request corresponding to first data representing a VC (e.g., a VP). The method 300 may include identifying (310), based on the first action, second data representing a first program for verifying transaction requests. The program may be, for example, computer code that takes as input parameters of the request (e.g., the identity of the requestor and the requested action) and outputs a Boolean indicating whether the transaction is to be allowed/denied. In various implementations, the SP-A 140 may receive the program from a node of a distributed ledger (e.g., a blockchain) or directly from the SP 130. In some implementations, the SP-A 140 may verify the authenticity of the program by comparing a hash of the program to a hash stored in a distributed ledger.

The method 300 may include various steps for validating the first request using the first data. The first data may include a VC that specifies a public key of the SC-A 120 (e.g., SC-A-Pub_K) signed using the private key of the SP 130 (e.g., the SP-Priv_K). The method 300 may include determining, using a public key corresponding to the SP 130 (e.g., the SP-Pub_K), that the VC was digitally signed using a corresponding private key (e.g., the SP-Priv_K). The method 300 may include determining (315) that the VC includes the public key of the SC-A 120 (e.g., the SC-A-Pub_K). The method 300 may include determining (320), using the SC-A-Pub_K specified in the first data, that the first request was digitally signed using the corresponding private key (e.g., SC-A_Priv_K). In response to determining that the VC was digitally signed using the SP-Priv_K and the first request was digitally signed using the SC-A-Priv_K, the method 300 may include determining (325), using the first program, that the SC-A 120 corresponding to the SC-A-Pub_K is authorized to request the first action. If the SP-A 140 determines that the SC-A 120 is not authorized to request the first action ("No" at 330), the method 300 may include denying (335) the first request. If the SP-A 140 determines that the SC-A 120 is authorized to request the first action ("Yes" at 330), the method 300 may include causing (340) execution of a first transaction between the first device and the second device, the first transaction corresponding to the first action.

The method 300 may include recording (345) a record of the transaction in an audit log of the first device and, upon determining network connectivity is available, uploading (350) the record of the transaction to a system component corresponding to a central authority.

Figure 4:
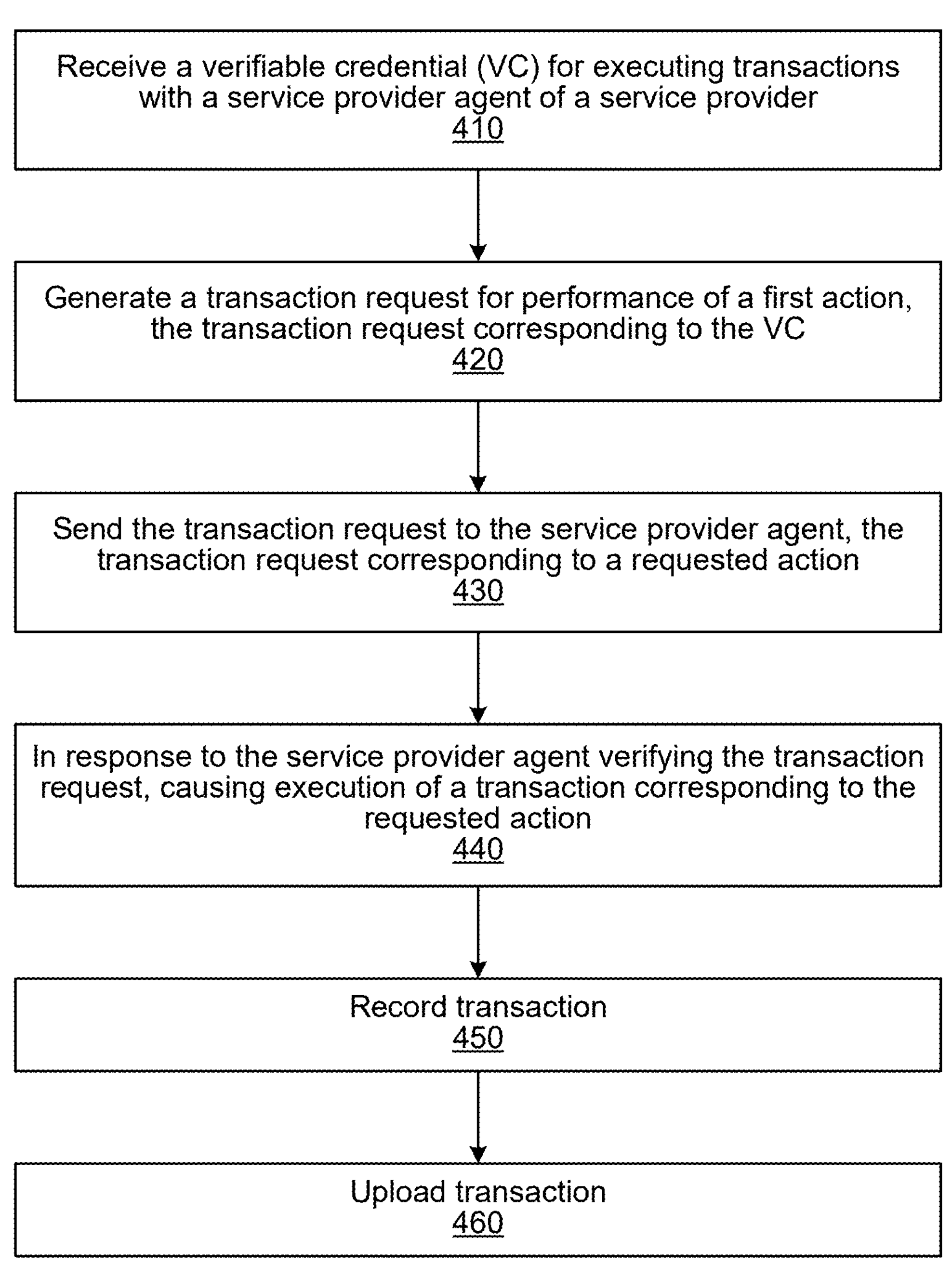
FIG. 4 is a flowchart illustrating operations of an example method of a service consumer agent requesting an action from a service consumer agent using a VC obtained from the service provider, according to embodiments of the present disclosure.

FIG. 4 is a flowchart illustrating operations of an example method 400 of an SC-A 120 requesting an action from an SP-A 140 using a VC obtained from the SP 130, according to embodiments of the present disclosure. The method 400 may include receiving (410), by a first device corresponding to the SC-A 120 of the SC-110, a VC for executing transactions with the SP-A 140 of the SP 130. The VC may include a public key of the SC-A 120 (e.g., the SC-A-Pub_K) signed using a private key of the SP 130 (e.g., the SP-Priv_K). The method 400 may include generating (420) a transaction request corresponding to a requested action. The transaction request may include or be accompanied by a verifiable presentation (VP) based on the VC. For example, the SC-A 120 may generate the VP by signing the VC with using the private key of the SC-A 120 (e.g., the SC-A-Priv_K). The method 400 may include sending (430) the transaction request with the VP to a second device corresponding to the SP-A 140. The second device may verify the transaction request using a public key corresponding to the SP 130 (e.g., the SP-Pub_K). For example, the SP-A 140 may verify that (a) the VC in the VP was signed by the SP 130, (b) that the VP was signed using the private key corresponding to the public key in the VC. In addition, the second device may use a program provided by the SP 130 (either directly or indirectly) to determine whether the SC-A 120 is authorized to engage in a transaction for the requested action. In response to the second device verifying the transaction request, the method 400 may include causing (440) execution of a transaction between the first device and the second device, where the first transaction corresponds to the requested action.

The method 400 may include recording (450), a record of the transaction in an audit log of the first device, and, upon determining network connectivity is available, uploading (460) the record of the transaction to a system component corresponding to a central authority.

FIG. 5 is a block diagram illustrating an example device 500 (e.g., corresponding to an SC-A 120 and/or an SP-A 140) and system component 550 (e.g., corresponding to an SC 110 and/or an SP 130) communicating over the computer network(s) 199, according to embodiments of the present disclosure. While the device 500 may operate locally to a user (e.g., within a same environment so the device may receive inputs and playback outputs for the requestor) the system component(s) 550 may be located remotely from the device 500. The system component(s) 550 may be located in an entirely different location from the device 500 (for example, as part of a cloud computing system or the like). For example, one or more devices 500 may be operating in a DDIL environment with sporadic or unreliable communication links to the system component(s) 550.

The device 500 may include one or more controllers/processors 504, which may each include a central processing unit (CPU) for processing data and computer-readable instructions, and a memory 506 for storing data and instructions of the respective device. The memories 506 may individually include volatile random-access memory (RAM), non-volatile read only memory (ROM), non-volatile magnetoresistive memory (MRAM), and/or other types of memory. Device 500 may also include a data storage component 508 for storing data and controller/processor-executable instructions. Each data storage component 508 may individually include one or more non-volatile storage types such as magnetic storage, optical storage, solid-state storage, etc. Device 500 may also be connected to removable or external non-volatile memory and/or storage (such as a removable memory card, memory key drive, networked storage, etc.) through respective input/output device interfaces 502.

Computer instructions for operating device 500 and its various components may be executed by the respective device's controller(s)/processor(s) 504, using the memory 506 as temporary "working" storage at runtime. A device's computer instructions may be stored in a non-transitory manner in non-volatile memory 506, data storage component 508, or an external device(s). Alternatively, some or all of the executable instructions may be embedded in hardware or firmware on the respective device in addition to or instead of software.

Device 500 includes input/output device interfaces 502. A variety of components may be connected through the input/output device interfaces 502, as will be discussed further below. Additionally, device 500 may include an address/data bus 510 for conveying data among components of the respective device. Each component within a device 500 may also be directly connected to other components in addition to (or instead of) being connected to other components across the bus 510.

The device 500 may include input/output device interfaces 502 that connect to a variety of components such as an audio output component such as a speaker 512, a wired headset or a wireless headset (not illustrated), or other component capable of outputting audio. The device 500 may also include an audio capture component. The audio capture component may be, for example, a microphone 520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 500 may additionally include a display 516 for displaying content. The device 500 may further include a camera 518.

Via antenna(s) 522, the input/output device interfaces 502 may connect to one or more computer networks 199 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 4G network, 5G network, etc. A wired connection such as Ethernet may also be supported. Through the network(s) 199, the system may be distributed across a networked environment. The I/O device interface 502 may also include communication components that allow data to be exchanged between devices such as different physical servers in a collection of servers or other components.

The system component 550 may include one or more physical devices and/or one or more virtual devices, such as virtual systems that run in a cloud server or similar environment. The system component 550 may include one or more input/output device interfaces 552 and controllers/processors 554. The system component 550 may further include a memory 556 and storage 558. A bus 560 may allow the input/output device interfaces 552, controllers/processors 554, memory 556, and storage 558 to communicate with each other; the components may instead or in addition be directly connected to each other or be connected via a different bus.

A variety of components may be connected through the input/output device interfaces 552. For example, the input/output device interfaces 552 may be used to connect to the computer network 199. Further components include keyboards, mice, displays, touchscreens, microphones, speakers, and any other type of user input/output device. The components may further include USB drives, removable hard drives, or any other type of removable storage.

The controllers/processors 554 may process data and computer-readable instructions and may include a general-purpose central-processing unit, a specific-purpose processor such as a graphics processor, a digital-signal processor, an application-specific integrated circuit, a microcontroller, or any other type of controller or processor. The memory 556 may include volatile random-access memory (RAM), non-volatile read only memory (ROM), non-volatile magnetoresistive (MRAM), and/or other types of memory. The memory 556 may be used for storing data and controller/processor-executable instructions on one or more non-volatile storage types, such as magnetic storage, optical storage, solid-state storage, etc.

Computer instructions for operating the system component 550 and its various components may be executed by the controller(s)/processor(s) 554 using the memory 556 as temporary "working" storage at runtime. The computer instructions may be stored in a non-transitory manner in the memory 556, storage 558, and/or an external device(s). Alternatively, some or all of the executable instructions may be embedded in hardware or firmware on the respective device in addition to or instead of software.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

Disjunctive language such as the phrase “at least one of X, Y, Z,” unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term “a” or “one” may include one or more items unless specifically stated otherwise. Further, the phrase “based on” is intended to mean “based at least in part on” unless specifically stated otherwise.

What is claimed is:

1. A computer-implemented method comprising:

receiving, by a first device corresponding to a service provider agent of a service provider, from a second device corresponding to a service consumer agent of a service consumer, a first request corresponding to a first action, the first request corresponding to first data representing a verifiable credential;

identifying, based on the first action, second data representing a first program for verifying transaction requests;

determining, using a first public key corresponding to the service provider, that the first data was digitally signed using a first private key corresponding to the first public key;

determining that the first data specifies a second public key;

determining, using the second public key, that the first request was digitally signed using a second private key corresponding to the second public key;

in response to determining that the first data was digitally signed using the first private key and the first request was digitally signed using the second private key, determining, using the first program, that the service consumer agent corresponding to the second public key is authorized to request the first action;

in response to determining that the service consumer agent is authorized to request the first action, causing execution of a first transaction between the service provider agent and service consumer agent, the first transaction corresponding to the first action;

determining that network connectivity is available; and in response to determining that network connectivity is available, uploading a record of the first transaction to a system component.

2. The computer-implemented method of claim 1, further comprising:

after causing execution the first transaction, receiving third data representing a second program for verifying transaction requests;

receiving, from a third device corresponding to a second service consumer agent, a second request to perform the first action;

determining, using the second program, that the second service consumer agent is not authorized to request the first action; and in response to determining that the second service consumer agent is not authorized to request the first action, denying the second request.

3. The computer-implemented method of claim 1, further comprising:

determining that the first transaction was invalid due to a rule change occurring after the service provider agent received the second data but before execution of the first transaction; and in response to determining that the first transaction was invalid due to a rule change, rolling back the first transaction.

4. The computer-implemented method of claim 1, further comprising:

prior to determining that the service consumer agent corresponding to the second public key is authorized to request the first action:

determining a first hash of the first program; and verifying the first hash against a second hash stored on a distributed ledger.

5. The computer-implemented method of claim 1, further comprising:

prior to receiving the first request:

receiving, by a first system component corresponding to the service provider from a second system component corresponding to the service consumer, the second public key;

signing, by the first system component, a document containing the second public key with the first private key to create the verifiable credential; and sending, by the first system component to the second system component, the verifiable credential.

6. The computer-implemented method of claim 1, further comprising:

storing, by a first system component corresponding to the service provider, the second data in at least a second system component corresponding to a first node of a distributed ledger, wherein the first device retrieves the second data from one of the second system component or a third system component corresponding to a second node of the distributed ledger.

7. A system, comprising:

one or more processors; and at least one memory comprising instructions that, when executed by the one or more processors, cause the system to:

receive, by a first device corresponding to a service provider agent of a service provider, from a second device corresponding to a service consumer agent of a service consumer, a first request corresponding to a first action, the first request corresponding to first data representing a verifiable credential;

identify, based on the first action, second data representing a first program for verifying transaction requests;

determine, using a first public key corresponding to the service provider, that the first data was digitally signed using a first private key corresponding to the first public key;

determine that the first data specifies a second public key;

determine, using the second public key, that the first request was digitally signed using a second private key corresponding to the second public key;

in response to determining that the first data was digitally signed using the first private key and the first request was digitally signed using the second private key, determine, using the first program, that the service consumer agent corresponding to the second public key is authorized to request the first action;

in response to determining that the service consumer agent is authorized to request the first action, cause execution of a first transaction between the service provider agent and service consumer agent, the first transaction corresponding to the first action;

determining that network connectivity is available; and in response to determining that network connectivity is available, uploading a record of the first transaction to a system component.

8. The system of claim 7, wherein the at least one memory further comprises instructions that, when executed by the one or more processors, further cause the system to:

after causing execution the first transaction, receive third data representing a second program for verifying transaction requests;

receive, from a third device corresponding to a second service consumer agent, a second request to perform the first action;

determine, using the second program, that the second service consumer agent is not authorized to request the first action; and in response to determining that the second service consumer agent is not authorized to request the first action, deny the second request.

9. The system of claim 7, wherein the at least one memory further comprises instructions that, when executed by the one or more processors, further cause the system to:

determine that the first transaction was invalid due to a rule change occurring after the service provider agent received the second data but before execution of the first transaction; and in response to determining that the first transaction was invalid due to a rule change, roll back the first transaction.

10. The system of claim 7, wherein the at least one memory further comprises instructions that, when executed by the one or more processors, further cause the system to:

prior to determining that the service consumer agent corresponding to the second public key is authorized to request the first action:

determine a first hash of the first program; and verify the first hash against a second hash stored on a distributed ledger.

11. The system of claim 7, wherein the at least one memory further comprises instructions that, when executed by the one or more processors, further cause the system to:

prior to receiving the first request:

receive, by a first system component corresponding to the service provider from a second system component corresponding to the service consumer, the second public key;

sign, by the first system component, a document containing the second public key with the first private key to create the verifiable credential; and send, by the first system component to the second system component, the verifiable credential.

12. The system of claim 7, wherein the at least one memory further comprises instructions that, when executed by the one or more processors, further cause the system to:

store, by a first system component corresponding to the service provider, the second data in at least a second system component corresponding to a first node of a distributed ledger, wherein the first device retrieves the second data from one of the second system component or a third system component corresponding to a second node of the distributed ledger.

* * * * *